UNITED STATES PATENT OFFICE.

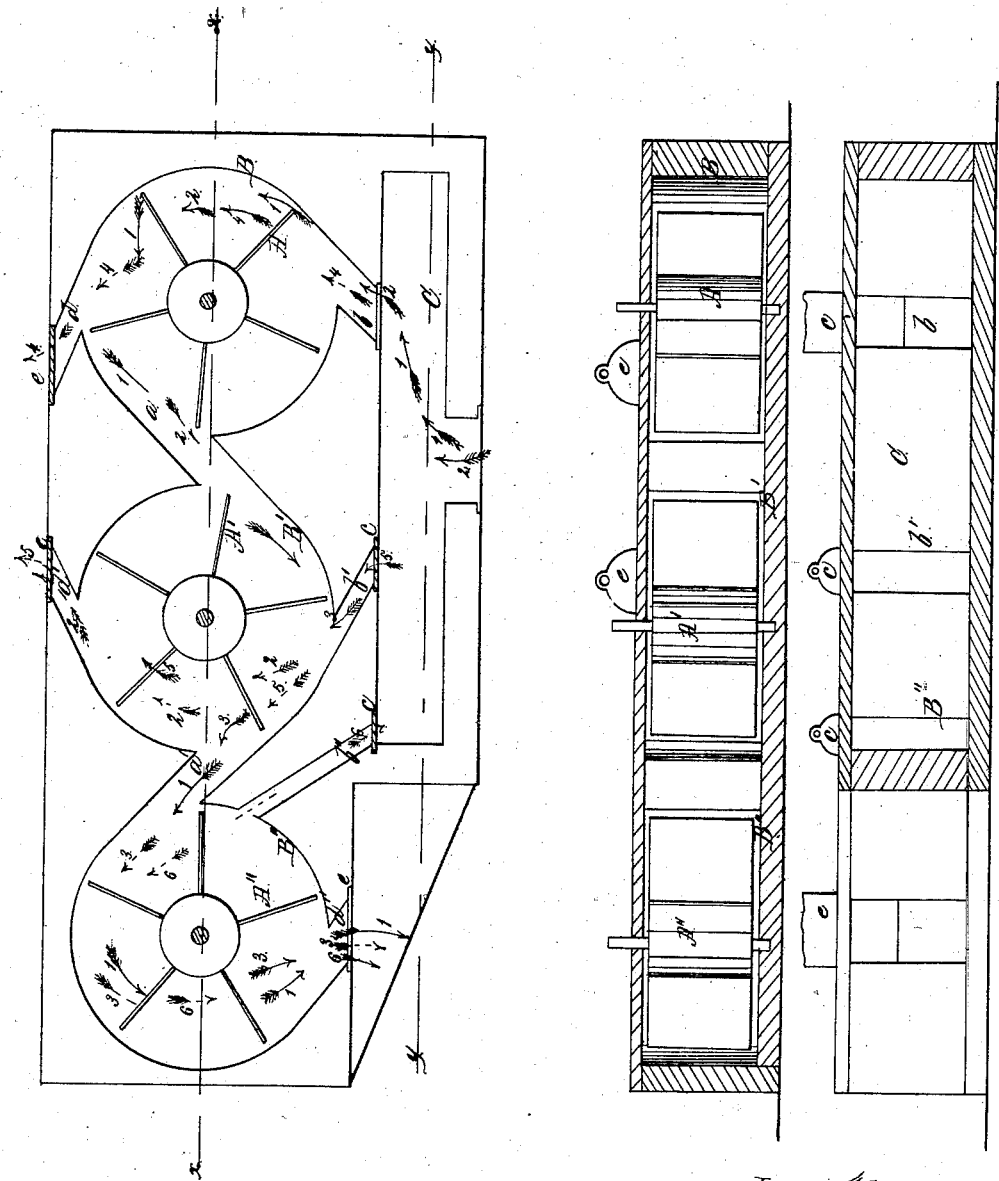

ISAAC MINER AND D. J. MINER, OF FREEHOLD, NEW YORK.

IMPROVEMENT IN WATER-WHEELS.

Specification forming part of Letters Patent No. 54,579, dated May 8, 1866.

*To all whom it may concern:*

Be it known that we, ISAAC MINER and D. J. MINER, of Freehold, in the county of Greene and State of New York, have invented a new and Improved Combination of Water-Wheels for Obtaining Power from Water; and we do hereby declare that the following is a full, clear, and exact description thereof, which will enable others skilled in the art to make and use the same, reference being had to the accompanying drawings, forming part of this specification, in which—

Figure 1 is a plan or top view of our invention with the cover of the curbs removed; Fig. 2, a side sectional view of the same, taken in the line $x\,x$, Fig. 1; Fig. 3, a side sectional view of the same, taken in the line $y\,y$, Fig. 1.

Similar letters of reference indicate like parts.

This invention consists in the employment or use of a plurality of wheels placed within curbs or cases arranged with gates in such a manner that all of the wheels may be acted upon by the same volume of water, the latter passing successively through the several curbs or cases, or any one or more of the wheels less than the whole number acted upon, as may be desired.

The object of the invention is to obtain a greater amount of power from a given quantity of water than has hitherto been obtained.

A A' A'' represent three water-wheels of equal diameter placed within circular curbs B B' B'', which communicate with each other by passages $a\,a'$, as shown clearly in Fig. 1. C represents the penstock, which communicates with the curbs B B' B'' by means of passages $b\,b'\,b''$, each of which is provided with a gate, $c$. The curbs B B' B'' are provided with discharge-openings $d\,d'\,d''$, each of which has a gate, $e$.

In case all of the wheels are to be used, the gates $e$ of the discharge-openings $d\,d'$ of the curbs B B' are closed, as well as the gates $c$ of the passages $b'\,b''$, the gate of the passage $b$ and the gate of the discharge-opening $d''$ of the curb B'' being open. The water then passes from the pen-stock C through the passage $b$ and acts upon the wheel A, and passes from the curb B through the passage $a$ and acts upon wheel A', and thence passes through the passage $a'$ and acts upon wheel A'', and is discharged at $d''$, as indicated by the arrows 1, Fig. 1.

In case two of the wheels A A' are required to be used, the gate $e$ of the discharge-opening $d''$ of the curb B'' is closed and the gate of the discharge-opening $d'$ opened, the other gates, with the exception of that of the passage $b$, being closed, and the water then passes through the curbs B B', operating the wheels A A', as indicated by the arrows 2.

In case the wheels A' A'' are to be operated, all the gates are closed with the exception of those of the passage $b'$ and the discharge-opening $d''$, and the water will pass through the curbs B' B'', as indicated by the arrows 3.

In case the wheel A is to be alone operated, the gates of the passage $b$ and that of the discharge-opening $d$ are only opened, and the water will pass through the curb B, as indicated by the arrows 4.

In case the wheel A' is to be alone operated, the gates of the passage $b'$ and the discharge-opening $d'$ are opened, and the water will pass through the curb B', as indicated by the arrows 5; and in case the wheel A'' is to be alone operated, the gate of the passage $b''$ and that of the discharge-opening $d''$ are opened, and the water will pass through the curb B'', as indicated by the arrows 6. Thus by this simple means a plurality of wheels may be driven by the same volume of water, and any one or more of the wheels less than the whole number used.

Having thus described our invention, we claim as new and desire to secure by Letters Patent—

The arrangement of the wheel A A' A'', placed within the curbs B B' B'', communication-passages $a\,a'$, supply-passages $b\,b'\,b''$, gates $c\,c\,c$, discharge-openings $d\,d'\,d''$, gates $e\,e\,e$, and penstock C relatively to each other, and operating in the manner and for the purpose herein specified.

The above specification of our invention signed by us this 18th day of July, 1865.

ISAAC MINER.
D. J. MINER.

Witnesses:
M. M. LIVINGSTON,
C. L. TOPLIFF.